(12) United States Patent
Zheng et al.

(10) Patent No.: US 9,858,951 B1
(45) Date of Patent: Jan. 2, 2018

(54) METHOD FOR PROVIDING A MULTILAYER AFM LAYER IN A READ SENSOR

(71) Applicant: Western Digital (Fremont), LLC, Fremont, CA (US)

(72) Inventors: Yuankai Zheng, Fremont, CA (US); Qunwen Leng, Palo Alto, CA (US); Xin Jiang, San Jose, CA (US); Zhitao Diao, Fremont, CA (US); Christian Kaiser, San Jose, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 14/955,375

(22) Filed: Dec. 1, 2015

(51) Int. Cl.
*G11B 5/39* (2006.01)
*G11B 5/127* (2006.01)
*H01F 1/00* (2006.01)

(52) U.S. Cl.
CPC .......... *G11B 5/1272* (2013.01); *G11B 5/3903* (2013.01); *H01F 1/0009* (2013.01)

(58) Field of Classification Search
CPC ......... G11B 5/39; G11B 5/3153; G11C 11/14; H01L 29/82; H01F 10/32222; H01F 10/324; H01F 10/325; H01F 10/3286; H01F 10/329
USPC .................. 428/811, 811.3, 694, 694 GR
See application file for complete search history.

(56) References Cited

U.S. PATENT DOCUMENTS

| 6,016,290 | A | 1/2000 | Chen et al. |
| 6,018,441 | A | 1/2000 | Wu et al. |
| 6,025,978 | A | 2/2000 | Hoshi et al. |
| 6,025,988 | A | 2/2000 | Yan |
| 6,032,353 | A | 3/2000 | Hiner et al. |
| 6,033,532 | A | 3/2000 | Minami |
| 6,034,851 | A | 3/2000 | Zarouri et al. |
| 6,043,959 | A | 3/2000 | Crue et al. |
| 6,046,885 | A | 4/2000 | Aimonetti et al. |
| 6,049,650 | A | 4/2000 | Jerman et al. |
| 6,055,138 | A | 4/2000 | Shi |

(Continued)

FOREIGN PATENT DOCUMENTS

EP    1096478    5/2001

OTHER PUBLICATIONS

Ming Sun, et al., U.S. Appl. No. 13/423,009, filed Mar. 16, 2012, 24 pages.

*Primary Examiner* — Tabassom Tadayyon Eslami
(74) *Attorney, Agent, or Firm* — Foley & Lardner LLP (57) ABSTRACT

A method provides a read sensor stack including an antiferromagnetic (AFM) layer, a pinned layer on the AFM layer, a free layer, and a nonmagnetic layer between the free and pinned layers. Providing the AFM layer includes depositing an AFM layer first portion at a first elevated temperature and at a rate of at least 0.1 Angstrom/second. This AFM layer first portion is annealed in-situ at at least one hundred degrees Celsius. An AFM sublayer is deposited at an elevated temperature and at a sublayer deposition rate of less than 0.1 Angstrom/second. The already-deposited portion of the AFM layer is annealed in-situ at at least one hundred degrees Celsius and less than five hundred degrees Celsius. The sublayer depositing and annealing steps may be repeated in order at least once to provide an AFM layer second portion that has multiple sublayers and is thinner than the AFM layer first portion.

18 Claims, 7 Drawing Sheets

(56) References Cited

U.S. PATENT DOCUMENTS

| | | |
|---|---|---|
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,086,730 A | 7/2000 | Liu et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,287,986 B1 | 9/2001 | Mihara |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,338,777 B1 | 1/2002 | Longstreth White |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,365,009 B1 | 4/2002 | Ishibashi |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,398,924 B1 * | 6/2002 | Pinarbasi .............. B82Y 10/00 204/192.2 |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |

(56) References Cited

U.S. PATENT DOCUMENTS

| | | |
|---|---|---|
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,669,787 B2 | 12/2003 | Gillies et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,731,477 B2 | 5/2004 | Lin et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,747,852 B2 | 6/2004 | Lin et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,780,524 B2 | 8/2004 | Lin et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,896,975 B2 | 5/2005 | Lin et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang |
| 7,363,697 B1 | 4/2008 | Dunn et al. |
| 7,371,152 B1 | 5/2008 | Newman |
| 7,372,665 B1 | 5/2008 | Stoev et al. |

(56) References Cited

U.S. PATENT DOCUMENTS

| | | | |
|---|---|---|---|
| 7,375,926 B1 | 5/2008 | Stoev et al. | |
| 7,379,269 B1 | 5/2008 | Krounbi et al. | |
| 7,386,933 B1 | 6/2008 | Krounbi et al. | |
| 7,389,577 B1 | 6/2008 | Shang et al. | |
| 7,417,832 B1 | 8/2008 | Erickson et al. | |
| 7,419,891 B1 | 9/2008 | Chen et al. | |
| 7,428,124 B1 | 9/2008 | Song et al. | |
| 7,430,098 B1 | 9/2008 | Song et al. | |
| 7,436,620 B1 | 10/2008 | Kang et al. | |
| 7,436,638 B1 | 10/2008 | Pan | |
| 7,440,220 B1 | 10/2008 | Kang et al. | |
| 7,443,632 B1 | 10/2008 | Stoev et al. | |
| 7,444,740 B1 | 11/2008 | Chung et al. | |
| 7,493,688 B1 | 2/2009 | Wang et al. | |
| 7,508,627 B1 | 3/2009 | Zhang et al. | |
| 7,522,377 B1 | 4/2009 | Jiang et al. | |
| 7,522,379 B1 | 4/2009 | Krounbi et al. | |
| 7,522,382 B1 | 4/2009 | Pan | |
| 7,542,246 B1 | 6/2009 | Song et al. | |
| 7,551,406 B1 | 6/2009 | Thomas et al. | |
| 7,552,523 B1 | 6/2009 | He et al. | |
| 7,554,767 B1 | 6/2009 | Hu | |
| 7,583,466 B2 | 9/2009 | Kermiche et al. | |
| 7,595,967 B1 | 9/2009 | Moon et al. | |
| 7,639,457 B1 | 12/2009 | Chen et al. | |
| 7,660,080 B1 | 2/2010 | Liu et al. | |
| 7,672,080 B1 | 3/2010 | Tang et al. | |
| 7,672,086 B1 | 3/2010 | Jiang | |
| 7,684,160 B1 | 3/2010 | Erickson et al. | |
| 7,688,546 B1 | 3/2010 | Bai et al. | |
| 7,691,434 B1 | 4/2010 | Zhang et al. | |
| 7,695,761 B1 * | 4/2010 | Shen .................. | B82Y 10/00 360/324.12 |
| 7,719,795 B2 | 5/2010 | Hu | |
| 7,726,009 B1 | 6/2010 | Liu et al. | |
| 7,729,086 B1 | 6/2010 | Song et al. | |
| 7,729,087 B1 | 6/2010 | Stoev et al. | |
| 7,736,823 B1 | 6/2010 | Wang et al. | |
| 7,785,666 B1 | 8/2010 | Sun et al. | |
| 7,796,356 B1 | 9/2010 | Fowler et al. | |
| 7,800,858 B1 | 9/2010 | Bajikar et al. | |
| 7,819,979 B1 | 10/2010 | Chen et al. | |
| 7,829,264 B1 | 11/2010 | Wang et al. | |
| 7,846,643 B1 | 12/2010 | Sun et al. | |
| 7,855,854 B2 | 12/2010 | Hu et al. | |
| 7,869,160 B1 | 1/2011 | Pan et al. | |
| 7,872,824 B1 | 1/2011 | Macchioni et al. | |
| 7,872,833 B2 | 1/2011 | Hu et al. | |
| 7,910,267 B1 | 3/2011 | Zeng et al. | |
| 7,911,735 B1 | 3/2011 | Sin et al. | |
| 7,911,737 B1 | 3/2011 | Jiang et al. | |
| 7,916,426 B2 | 3/2011 | Hu et al. | |
| 7,918,013 B1 | 4/2011 | Dunn et al. | |
| 7,968,219 B1 | 6/2011 | Jiang et al. | |
| 7,982,989 B1 | 7/2011 | Shi et al. | |
| 8,008,912 B1 | 8/2011 | Shang | |
| 8,012,804 B1 | 9/2011 | Wang et al. | |
| 8,015,692 B1 | 9/2011 | Zhang et al. | |
| 8,018,677 B1 | 9/2011 | Chung et al. | |
| 8,018,678 B1 | 9/2011 | Zhang et al. | |
| 8,024,748 B1 | 9/2011 | Moravec et al. | |
| 8,072,705 B1 | 12/2011 | Wang et al. | |
| 8,074,345 B1 | 12/2011 | Anguelouch et al. | |
| 8,077,418 B1 | 12/2011 | Hu et al. | |
| 8,077,434 B1 | 12/2011 | Shen et al. | |
| 8,077,435 B1 | 12/2011 | Liu et al. | |
| 8,077,557 B1 | 12/2011 | Hu et al. | |
| 8,079,135 B1 | 12/2011 | Shen et al. | |
| 8,081,403 B1 | 12/2011 | Chen et al. | |
| 8,091,210 B1 | 1/2012 | Sasaki et al. | |
| 8,097,846 B1 | 1/2012 | Anguelouch et al. | |
| 8,104,166 B1 | 1/2012 | Zhang et al. | |
| 8,116,043 B2 | 2/2012 | Leng et al. | |
| 8,116,171 B1 | 2/2012 | Lee | |
| 8,125,856 B1 | 2/2012 | Li et al. | |
| 8,134,794 B1 | 3/2012 | Wang | |
| 8,136,224 B1 | 3/2012 | Sun et al. | |
| 8,136,225 B1 | 3/2012 | Zhang et al. | |
| 8,136,805 B1 | 3/2012 | Lee | |
| 8,141,235 B1 | 3/2012 | Zhang | |
| 8,146,236 B1 | 4/2012 | Luo et al. | |
| 8,149,536 B1 | 4/2012 | Yang et al. | |
| 8,151,441 B1 | 4/2012 | Rudy et al. | |
| 8,163,185 B1 | 4/2012 | Sun et al. | |
| 8,164,760 B2 | 4/2012 | Willis | |
| 8,164,855 B1 | 4/2012 | Gibbons et al. | |
| 8,164,864 B2 | 4/2012 | Kaiser et al. | |
| 8,165,709 B1 | 4/2012 | Rudy | |
| 8,166,631 B1 | 5/2012 | Tran et al. | |
| 8,166,632 B1 | 5/2012 | Zhang et al. | |
| 8,169,473 B1 | 5/2012 | Yu et al. | |
| 8,171,618 B1 | 5/2012 | Wang et al. | |
| 8,179,636 B1 | 5/2012 | Bai et al. | |
| 8,191,237 B1 | 6/2012 | Luo et al. | |
| 8,194,365 B1 | 6/2012 | Leng et al. | |
| 8,194,366 B1 | 6/2012 | Li et al. | |
| 8,196,285 B1 | 6/2012 | Zhang et al. | |
| 8,200,054 B1 | 6/2012 | Li et al. | |
| 8,203,800 B2 | 6/2012 | Li et al. | |
| 8,208,350 B1 | 6/2012 | Hu et al. | |
| 8,220,140 B1 | 7/2012 | Wang et al. | |
| 8,222,599 B1 | 7/2012 | Chien | |
| 8,225,488 B1 | 7/2012 | Zhang et al. | |
| 8,227,023 B1 | 7/2012 | Liu et al. | |
| 8,228,633 B1 | 7/2012 | Tran et al. | |
| 8,231,796 B1 | 7/2012 | Li et al. | |
| 8,233,248 B1 | 7/2012 | Li et al. | |
| 8,248,896 B1 | 8/2012 | Yuan et al. | |
| 8,254,060 B1 | 8/2012 | Shi et al. | |
| 8,257,597 B1 | 9/2012 | Guan et al. | |
| 8,259,410 B1 | 9/2012 | Bai et al. | |
| 8,259,539 B1 | 9/2012 | Hu et al. | |
| 8,262,918 B1 | 9/2012 | Li et al. | |
| 8,262,919 B1 | 9/2012 | Luo et al. | |
| 8,264,797 B2 | 9/2012 | Emley | |
| 8,264,798 B1 | 9/2012 | Guan et al. | |
| 8,270,126 B1 | 9/2012 | Roy et al. | |
| 8,276,258 B1 | 10/2012 | Tran et al. | |
| 8,277,669 B1 | 10/2012 | Chen et al. | |
| 8,279,719 B1 | 10/2012 | Hu et al. | |
| 8,284,517 B1 | 10/2012 | Sun et al. | |
| 8,288,204 B1 | 10/2012 | Wang et al. | |
| 8,289,821 B1 | 10/2012 | Huber | |
| 8,291,743 B1 | 10/2012 | Shi et al. | |
| 8,307,539 B1 | 11/2012 | Rudy et al. | |
| 8,307,540 B1 | 11/2012 | Tran et al. | |
| 8,308,921 B1 | 11/2012 | Hiner et al. | |
| 8,310,785 B1 | 11/2012 | Zhang et al. | |
| 8,310,901 B1 | 11/2012 | Batra et al. | |
| 8,315,019 B1 | 11/2012 | Mao et al. | |
| 8,316,527 B2 | 11/2012 | Hong et al. | |
| 8,320,076 B1 | 11/2012 | Shen et al. | |
| 8,320,077 B1 | 11/2012 | Tang et al. | |
| 8,320,219 B1 | 11/2012 | Wolf et al. | |
| 8,320,220 B1 | 11/2012 | Yuan et al. | |
| 8,320,722 B1 | 11/2012 | Yuan et al. | |
| 8,322,022 B1 | 12/2012 | Yi et al. | |
| 8,322,023 B1 | 12/2012 | Zeng et al. | |
| 8,325,569 B1 | 12/2012 | Shi et al. | |
| 8,333,008 B1 | 12/2012 | Sin et al. | |
| 8,334,093 B2 | 12/2012 | Zhang et al. | |
| 8,336,194 B2 | 12/2012 | Yuan et al. | |
| 8,339,738 B1 | 12/2012 | Tran et al. | |
| 8,341,826 B1 | 1/2013 | Jiang et al. | |
| 8,343,319 B1 | 1/2013 | Li et al. | |
| 8,343,364 B1 | 1/2013 | Gao et al. | |
| 8,349,195 B1 | 1/2013 | Si et al. | |
| 8,351,307 B1 | 1/2013 | Wolf et al. | |
| 8,357,244 B1 | 1/2013 | Zhao et al. | |
| 8,373,945 B1 | 2/2013 | Luo et al. | |
| 8,375,564 B1 | 2/2013 | Luo et al. | |
| 8,375,565 B2 | 2/2013 | Hu et al. | |
| 8,381,391 B2 | 2/2013 | Park et al. | |
| 8,385,157 B1 | 2/2013 | Champion et al. | |

(56) References Cited

U.S. PATENT DOCUMENTS

| | | |
|---|---|---|
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2006/0278524 A1 | 12/2006 | Stowell |
| 2008/0074807 A1* | 3/2008 | Carey ............... G01R 33/093 360/324.11 |
| 2010/0290157 A1 | 11/2010 | Zhang et al. |
| 2011/0086240 A1 | 4/2011 | Xiang et al. |
| 2012/0063218 A1* | 3/2012 | Huai ................. G11C 11/16 365/171 |
| 2012/0111826 A1 | 5/2012 | Chen et al. |
| 2012/0134201 A1* | 5/2012 | Ogimoto ............. B82Y 25/00 365/158 |
| 2012/0216378 A1 | 8/2012 | Emley et al. |
| 2012/0237878 A1 | 9/2012 | Zeng et al. |
| 2012/0264234 A1* | 10/2012 | Zhou ................. H01L 43/10 438/3 |
| 2012/0298621 A1 | 11/2012 | Gao |
| 2013/0001717 A1* | 1/2013 | Zhou ................. H01F 10/3286 257/421 |
| 2013/0099780 A1 | 4/2013 | Ma et al. |
| 2013/0216702 A1 | 8/2013 | Kaiser et al. |
| 2013/0216863 A1 | 8/2013 | Li et al. |
| 2013/0257421 A1 | 10/2013 | Shang et al. |

(56) References Cited

U.S. PATENT DOCUMENTS

2014/0038314 A1\* 2/2014 Zhou .................... G11C 11/161
438/3
2014/0154529 A1 6/2014 Yang et al.
2014/0175050 A1 6/2014 Zhang et al.

\* cited by examiner

METHOD FOR PROVIDING A MULTILAYER AFM LAYER IN A READ SENSOR

BACKGROUND

Figure 1:
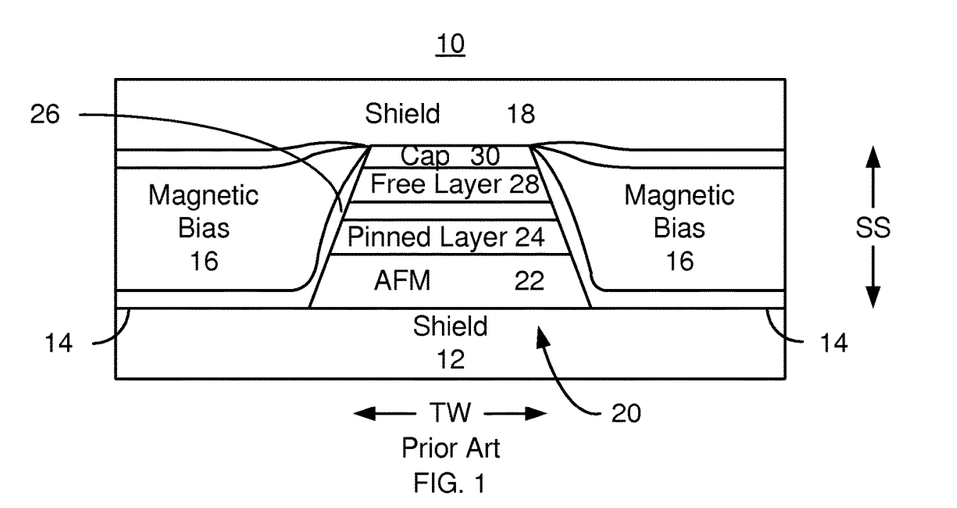
FIG. 1 depicts an ABS view of a conventional magnetic recording read apparatus.

FIG. 1 depicts an air-bearing surface (ABS) view of a conventional read apparatus used in magnetic recording technology applications. The conventional read apparatus 10 includes shields 12 and 18, insulator 14, magnetic bias structures 16, and sensor 20. The read sensor 20 is typically a giant magnetoresistive (GMR) sensor or tunneling magnetoresistive (TMR) sensor. The read sensor 20 includes an antiferromagnetic (AFM) layer 22, a pinned layer 24, a nonmagnetic spacer layer 26, and a free layer 28. Also shown is a capping layer 30. In addition, seed layer(s) may be used. The free layer 28 has a magnetization sensitive to an external magnetic field. Thus, the free layer 28 functions as a sensor layer for the magnetoresistive sensor 20. If the sensor 20 is to be used in a current perpendicular to plane (CPP) configuration, then current is driven in a direction substantially perpendicular to the plane of the layers 22, 24, 26, and 28. Conversely, in a current parallel to plane (CIP) configuration, then conductive leads (not shown) would be provided on the magnetic bias structures 16. The magnetic bias structures 16 are used to magnetically bias the free layer 28.

Although the conventional apparatus 10 functions, there are drawbacks. The trend in magnetic recording is to higher areal densities. A lower track width (TW) is desired for higher areal density media. In addition, a reduced shield-to-shield spacing (SS) is desired for higher density memories. Consequently, the thickness and area of the layers 22, 24, 26 and 28 may be reduced. The volume of these layers is, therefore, decreased. This may adversely affect performance of the sensor 20. For example, such reductions in the volume of the AFM layer 22 adversely affect the thermal stability of the magnetoresistive sensor 20. Such instabilities in the magnetoresistive sensor 20 are undesirable. Although other mechanisms for pinning the magnetic moment of the pinned layer 24 may exist, there may be manufacturing or other drawbacks. Accordingly, what is needed is a system and method for improving the performance of a magnetic recording read apparatus.

DETAILED DESCRIPTION OF THE PREFERRED EMBODIMENTS

While the various embodiments disclosed are applicable to a variety of data storage devices such as magnetic recording disk drives, solid-state hybrid disk drives, networked storage systems etc., for the sake of illustration the description below uses disk drives as examples.

Figure 2:
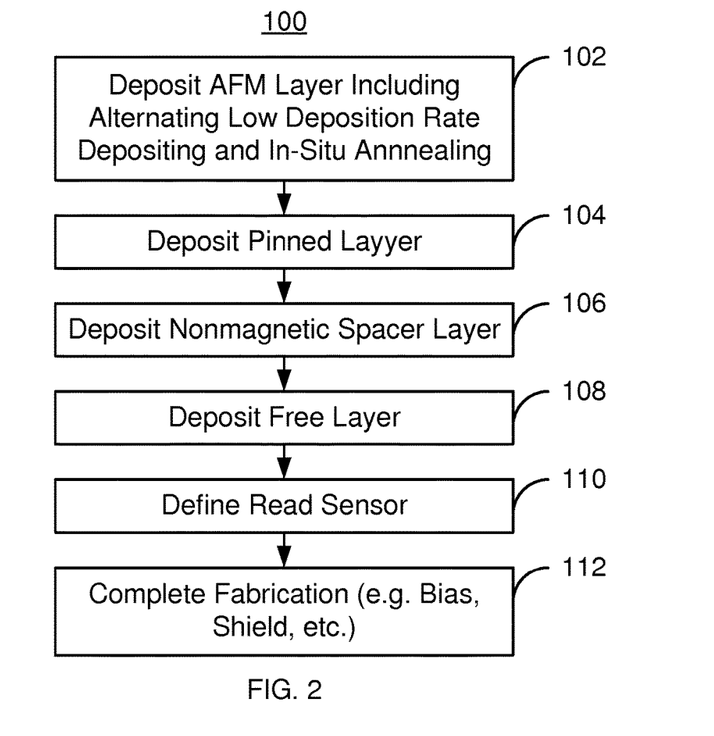
FIG. 2 is flow chart depicting an exemplary embodiment of a method for providing a magnetic recording read apparatus.

FIG. 2 is an exemplary embodiment of a method 100 for providing a magnetic read apparatus. For simplicity, some steps may be omitted, interleaved, combined, include multiple substeps and/or performed in another order unless otherwise specified. The method 100 is described in the context of providing a read apparatus that may be used in a magnetic recording disk drive. The method 100 may be used to fabricate multiple magnetic read apparatuses at substantially the same time. The method 100 may also be used to fabricate magnetic recording apparatuses usable in other data storage devices. The method 100 is described in the context of particular layers. A particular layer may include multiple materials and/or multiple sub-layers. The method 100 also may start after formation of other portions of the magnetic recording apparatus. For example, the method 100 may start after the bottom (e.g. leading) shield has been formed.

An antiferromagnetic (AFM) layer that is a multilayer is provided, via step 102. The step of providing the AFM layer includes using multiple deposition steps separated by anneal steps. The deposition steps occur at elevated temperatures and at least two different deposition rates. As used herein, an elevated temperature is above room temperature and may be at least one hundred degrees Celsius. The AFM layer thus includes a first portion deposited at a higher deposition rate and a second portion deposited at lower deposition rate(s). For example, the step of providing the AFM layer includes depositing a first portion of the AFM layer at a first, elevated deposition temperature and a first deposition rate of at least 0.1 Angstrom/second. In some embodiments, the first deposition rate does not exceed 0.3 Angstrom/second. This first portion of the AFM layer is annealed after deposition is complete.

The second portion of the AFM layer is provided on the first portion of the AFM layer. This second portion includes multiple sublayers and anneals. Each sublayer of the AFM layer is deposited at an elevated sublayer deposition temperature and a sublayer deposition rate. The sublayer may be an IrMn sublayer. However, in other embodiments other material(s) may be used. In addition, the AFM material(s) used for the second portion of the AFM layer might be different than the AFM material(s) used for the first portion of the AFM layer. The sublayer deposition rate is less than 0.1 Angstrom/second. In some embodiments, the sublayer deposition rate is at least 0.01 Angstrom/second. In some embodiments, each sublayer is deposited at substantially the same rate. However, in other embodiments, different sublayers may have different deposition rates. The deposition rate for the sublayer is less than the deposition rate for the first portion of the AFM layer. This low deposition rate may be accomplished by reducing the power for the deposition system and increasing the pressure of the gas. For example, a sputtering power may be reduced and/or gas pressure for the plasma may be increased to achieve the desired sublayer deposition rate. The sublayer is also thin. In some embodiments, the thickness of the sublayer is at least one Angstrom and not more than five Angstroms. In some such embodiments, the thickness of the sublayer does not exceed three Angstroms. An anneal is performed at an elevated sublayer anneal temperature after deposition of the sublayer. Note that the anneal not only anneals the sublayer but also any layer(s) below the sublayer. The steps of depositing a sublayer and annealing the sublayer and layer(s) below the sublayer are alternated until the second portion of the AFM layer is completed.

The AFM layer formed in step 102 thus includes a first portion and a second portion. The first portion is deposited at a higher deposition rate and annealed. The second portion includes sublayers, each of which is deposited at a lower deposition rate and annealed. The sublayer anneal steps separate sublayer deposition steps. The first portion of the AFM layer has a first thickness. The second portion of the AFM layer has a second thickness that is less than the first thickness. In some embodiments, the first thickness is at least fifty percent of the total thickness of the AFM layer. In some cases, the thickness of the first portion of the AFM layer is greater than fifty percent and not more than ninety percent of the total thickness of the AFM layer.

A ferromagnetic pinned layer is provided on the AFM layer, via step 104. The ferromagnetic pinned layer is closer to the second portion of the AFM layer. In some embodiments, the ferromagnetic pinned layer adjoins the second portion of the AFM layer. Step 104 may include depositing a multilayer that may include nonmagnetic layer(s). The ferromagnetic pinned layer may be a synthetic antiferromagnet (SAF) including two antiferromagnetically coupled ferromagnetic layers separated by a nonmagnetic spacer layer, such as Ru. Other multilayers might be formed in step 104. Alternatively, the ferromagnetic pinned layer may be a single layer.

A nonmagnetic layer is provided on the ferromagnetic pinned layer, via step 106. Step 106 may include providing an insulating tunneling barrier layer, such as a crystalline MgO layer, a conductive layer or another nonmagnetic layer.

A ferromagnetic free layer is deposited on the nonmagnetic layer, via step 108. The ferromagnetic free layer may be a single layer or a multilayer. Thus, a read sensor stack including the AFM layer, the ferromagnetic pinned layer, the nonmagnetic layer and the ferromagnetic free layer is formed in steps 102, 104, 106 and 108. Note that the read sensor stack may also include seed and/or capping layer(s).

The read sensor is defined from the read sensor stack in at least a cross-track direction, via step 110. Step 110 may include forming a mask covering at least a portion of the read sensor stack used to form the read sensor and milling the exposed portions of the read sensor stack. In some embodiments, the read sensor stack may also be defined in the stripe height direction. Thus, the read sensor width in the cross-track direction and the read sensor maximum length in the stripe height direction perpendicular to the ABS may be defined. Fabrication may then be completed, via step 112. Step 112 may include providing side magnetic bias structures, providing a top (trailing) shield and lapping the read apparatus to define a media-facing surface, such as an air-bearing surface (ABS). In addition, a write apparatus, electronics and other components may be formed.

Using the method 100, a read sensor having improved stability may be formed. It has been determined that the AFM layer provided in step 102 may have a higher blocking temperature (i.e. a higher magnetic ordering temperature) and a higher exchange field than the conventional AFM layer 22 depicted in FIG. 1. This is believed to be due to an improved crystal structure of at least the second portion of the AFM. Thus, the AFM layer provided using the method 100 may be more magnetically stable. As a result, the magnetic moment of the pinned layer provided in step 104 may be better fixed in place. The stability and performance of the read sensor being fabricated may thus be improved. As a result, read sensors that are usable in higher areal density memories may be formed. Furthermore, depositing the first portion of the AFM layer at a higher rate allows for the time to fabricate the AFM layer to be significantly reduced over an AFM layer that is fabricated in the same manner as the second portion only. Thus, manufacturability may be maintained while performance may be enhanced.

Figure 3:
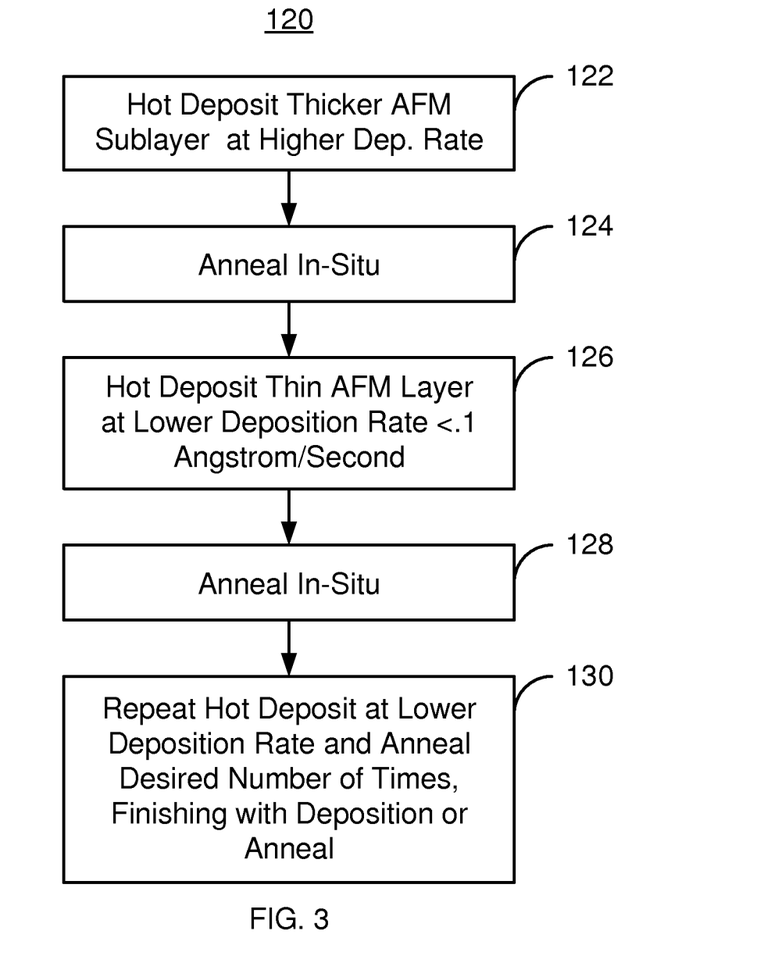
FIG. 3 is flow chart depicting an exemplary embodiment of a method for providing an antiferromagnetic layer magnetic read apparatus.

FIG. 3 is an exemplary embodiment of a method 12 for providing an AFM layer of a magnetic read apparatus. For simplicity, some steps may be omitted, interleaved, combined, include multiple substeps and/or performed in another order unless otherwise specified. The method 120 is described in the context of providing a read apparatus that may be used in a magnetic recording disk drive. The method 120 may be used to fabricate the AFM layer(s) for multiple magnetic read apparatuses at substantially the same time. The method 120 is also described in the context of particular layers. A particular layer may include multiple materials and/or multiple sub-layers. The method 120 also may start after formation of other portions of the magnetic recording apparatus.

A first portion of the AFM layer is deposited at a first, elevated deposition temperature and a first deposition rate, via step 122. The first portion of the AFM layer may be IrMn. The first deposition temperature is greater than one hundred degrees Celsius and less than five hundred degrees Celsius. In some embodiments, the first deposition temperature is at least two hundred degrees Celsius and not more than four hundred degrees Celsius. Thus, the deposition occurs at temperatures above room temperature. The deposition rate is at least 0.1 Angstrom/second. In some embodiments, the first deposition rate also does not exceed 0.3 Angstrom/second.

This first portion of the AFM layer is annealed in-situ at a first anneal temperature of at least one hundred degrees Celsius, via step 124. In some embodiments, the first anneal temperature is at least two hundred degrees Celsius and not more than four hundred degrees Celsius. Because the anneal is carried out in-situ, the substrate (and thus the first portion of the AFM layer) need not be exposed to ambient environment outside the fabrication apparatus.

A thin sublayer of the AFM layer is deposited at an elevated sublayer deposition temperature and a sublayer deposition rate, via step 126. The sublayer may be an IrMn sublayer. However, in other embodiments other material(s) may be used. In addition, the AFM material(s) used for the sublayer might be the same as or different from AFM material(s) used for the first portion of the AFM layer. The sublayer deposition temperature is greater than one hundred degrees Celsius and less than five hundred degrees Celsius. In some embodiments, the sublayer deposition temperature is at least two hundred degrees Celsius and not more than four hundred degrees Celsius. Thus, the temperature range for deposition of the sublayer and deposition of the first portion of the AFM layer are the same. The actual temperature used during the deposition of the sublayer can, but need not be, the same as the temperature used for the first portion of the AFM layer. The sublayer deposition rate is less than 0.1 Angstrom/second. In some embodiments, the sublayer deposition rate is at least 0.01 Angstrom/second. Thus, the deposition rate for the sublayer is less than the deposition rate for the first portion of the AFM layer. The sublayer is also thin. In some embodiments, the thickness of the sublayer is at least one Angstrom and not more than five Angstroms. In some such embodiments, the thickness of the sublayer does not exceed three Angstroms. Such thicknesses are significantly less than the thickness of the first portion of the AFM layer deposited in step 122.

An in-situ sublayer anneal is performed at a sublayer anneal temperature after deposition of the sublayer, via step 128. Because the sublayer is on the first portion of the AFM layer, both the first portion of the AFM layer and the sublayer are annealed. Stated differently, any portion of the AFM layer that has already been deposited is annealed. Any structures formed before the AFM layer may also be annealed. The sublayer anneal temperature is at least one hundred degrees Celsius and less than five hundred degrees Celsius. In some embodiments, the sublayer anneal temperature is at least two hundred degrees Celsius and not more than four hundred degrees Celsius. Thus, the anneal temperature for the sublayer is in the same temperature range as the anneal temperature for the first portion of the AFM layer. The anneal temperature used for the sublayer may, but need not be, the same as the first anneal temperature used for the first portion of the AFM layer. The anneal may be carried out for an anneal time of not more than two hundred seconds. In some embodiments, the anneal time does not exceed twice the time taken to deposit the sublayer. In some cases, the anneal time and deposition time for the sublayer are substantially equal. However, other anneal times may be possible.

The steps of depositing a sublayer (step 126) and annealing the sublayer and layer(s) below the sublayer (step 128) are repeated until the AFM layer is completed, via step 130. The AFM layer formed using the method 120 includes a first portion and a second portion. The first portion is deposited at a higher deposition rate and annealed in steps 122 and 124. The second portion includes sublayers, each of which is deposited at a lower deposition rate and annealed, with the anneal step separating sublayer deposition steps. This is carried out in steps 126, 128 and 130. The first portion of the AFM layer has a first thickness greater than the second thickness of the second portion of the AFM layer. In some embodiments, the first thickness is at least fifty percent of the total thickness of the AFM layer. For example, the AFM layer may be a total approximately sixty Angstroms thick. The second thickness of the second portion of the AFM layer is not more than thirty Angstroms. In some embodiments, the thickness of the second portion of the AFM layer may be significantly less. For example, the second portion of the AFM layer may be at least seven Angstroms and not more than twenty Angstroms thick. In some cases, the thickness of the first portion of the AFM layer is greater than fifty percent and not more than ninety percent of the total thickness of the AFM layer.

Using the method 120, an AFM layer having a higher blocking temperature and a higher exchange field may be fabricated. This is believed to be due to an improved crystal structure of at least the second portion of the AFM. Thus, the AFM layer provided using the method 120 may be more magnetically stable. As a result, the magnetic moment a pinned layer magnetically coupled to the AFM layer may be better fixed in place. The stability and performance of the read sensor using the AFM layer may be improved. As a result, read sensors that are usable in higher areal density memories may be formed. Furthermore, depositing the first portion of the AFM layer at a higher rate allows for the time to fabricate the AFM layer to be significantly reduced over an AFM layer that only includes the second portion. Thus, manufacturability may be maintained while performance may be enhanced.

Figure 4:
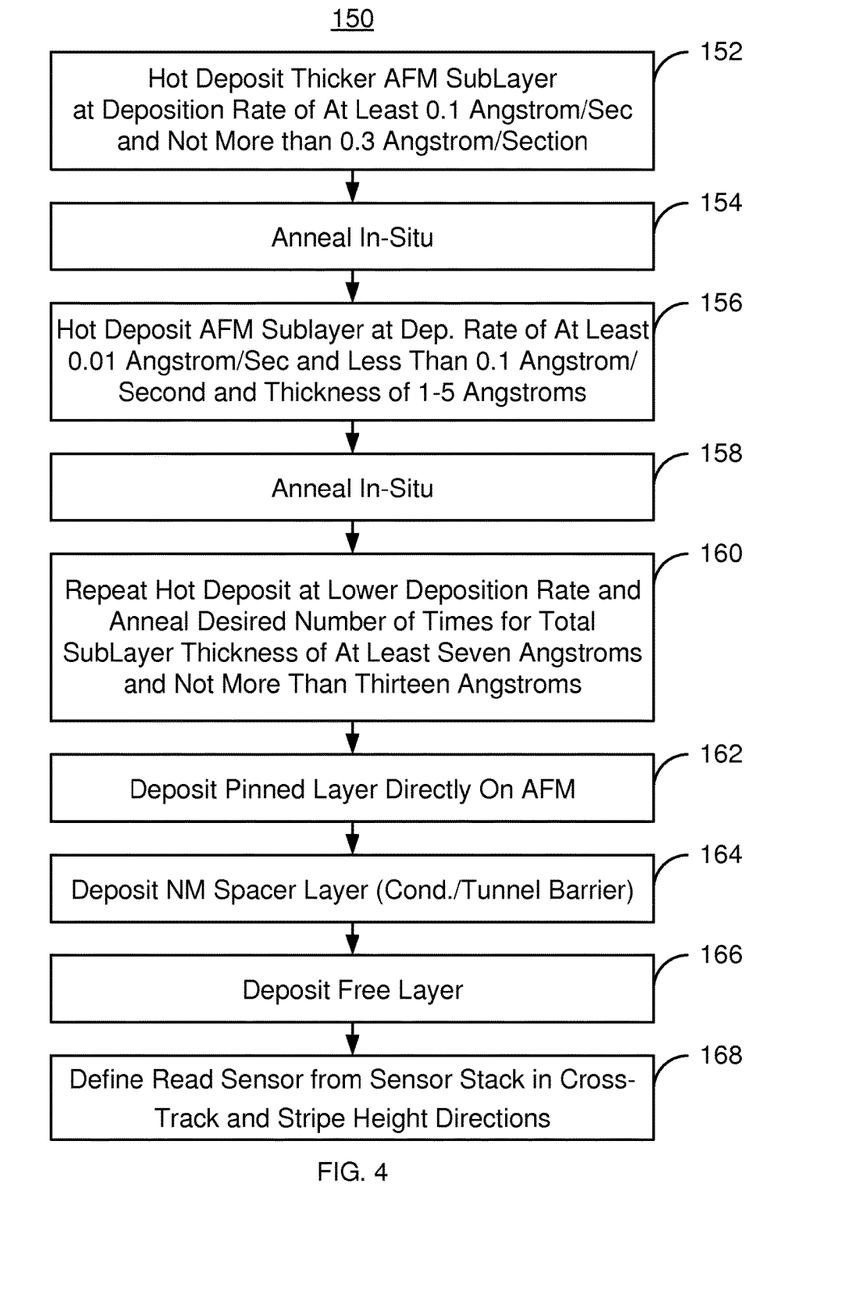
FIG. 4 is flow chart depicting an exemplary embodiment of a method for providing a read sensor in a magnetic read apparatus.

FIG. 4 is a flow chart depicting an exemplary embodiment of a method 150 for providing a read sensor of a magnetic read apparatus. For simplicity, some steps may be omitted, interleaved, combined, include multiple substeps and/or performed in another order unless otherwise specified. FIGS. 5-11 depict ABS views of an exemplary embodiment of a magnetic recording read apparatus 200 during fabrication using the method 150. For clarity FIGS. 5-11 are not to scale and only portions of the read apparatus 200 are depicted. Referring to FIGS. 4-11 the method 150 is described in the context of providing a magnetic recording disk drive and a magnetic read apparatus 200. The method 150 may be used to fabricate multiple magnetic read apparatuses at substantially the same time. The method 150 may also be used to fabricate other magnetic recording apparatuses and/or other data storage devices. The method 150 is also described in the context of particular layers. A particular layer may include multiple materials and/or multiple sublayers. The method 150 also may start after formation of other portions of the magnetic recording apparatus. For example, a shield 202 may have been provided.

Figure 5:
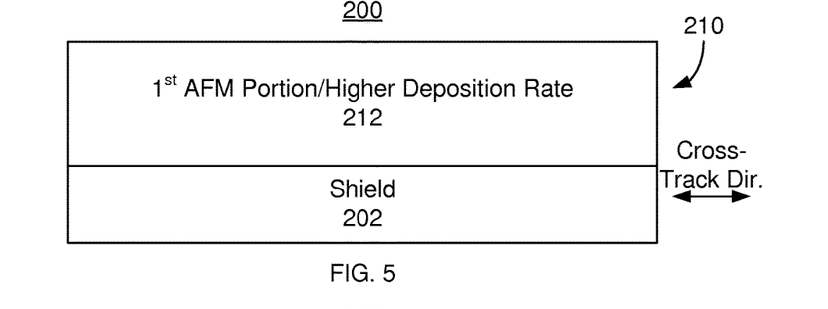
FIGS. 5-11 depict ABS views of another exemplary embodiment of a portion of a magnetic read apparatus during fabrication.

A first, thicker portion of the AFM layer is deposited at a first, elevated deposition temperature and a first, higher deposition rate, via step 152. Step 152 is analogous to step 122. The first portion of the AFM layer may be IrMn. The first deposition temperature may be in the ranges described above. Thus, the deposition occurs at temperatures above room temperature. The deposition rate is at least 0.1 Angstrom/second. In some embodiments, the first deposition rate also does not exceed 0.3 Angstrom/second. FIG. 5 depicts the magnetic read apparatus 200 after step 152 is performed. Thus, the first AFM portion 212 of the AFM layer 210 has been deposited on the shield 202.

This first portion of the AFM layer is annealed in-situ at a first anneal temperature of at least one hundred degrees Celsius, via step 154. Step 154 is analogous to step 124.

A thin sublayer of the AFM layer is deposited at an elevated sublayer deposition temperature and a sublayer deposition rate, via step 156. The sublayer may be an IrMn sublayer. However, in other embodiments other material(s) may be used. In addition, the AFM material(s) used for the sublayer might be the same as or different from AFM material(s) used for the first portion of the AFM layer. The sublayer deposition temperature may be in the ranges described above. Thus, the sublayer deposition occurs at temperatures above room temperature. The sublayer deposition rate is less than 0.1 Angstrom/second. In some embodiments, the sublayer deposition rate is at least 0.01 Angstrom/second. Thus, the deposition rate for the sublayer is less than the deposition rate for the first portion 212 of the AFM layer 210.

Figure 6:
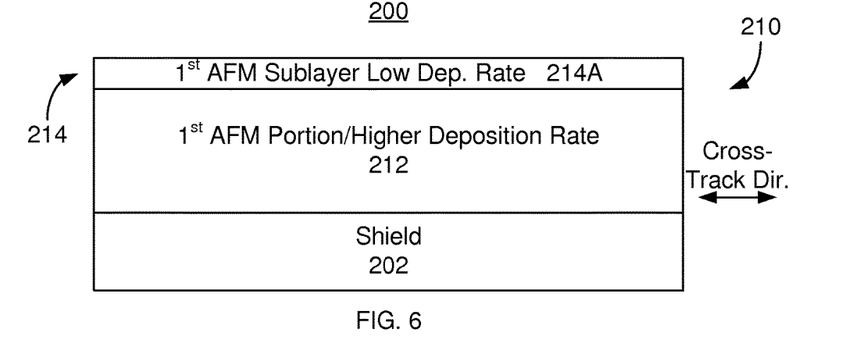

FIG. 6 depicts the read apparatus 200 after step 156 has been performed. Thus, the first sublayer 214A of the AFM layer 210 has been formed. This sublayer 214A is part of the second portion 214 of the AFM layer 210. The sublayer 214A is thin. In some embodiments, the thickness of the sublayer 214A is at least one Angstrom and not more than five Angstroms. In some such embodiments, the thickness of the sublayer 214A does not exceed three Angstroms.

An in-situ sublayer anneal is performed at a sublayer anneal temperature after deposition of the sublayer, via step 158. The anneal performed in step 158 is analogous to the anneal of step 128.

Figure 7:
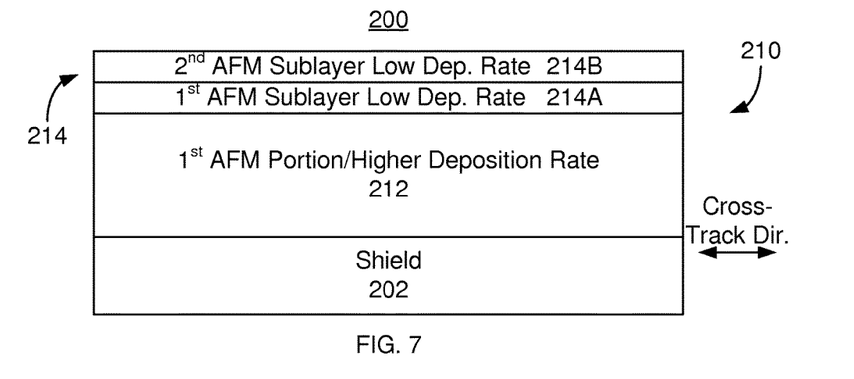
Figure 8:
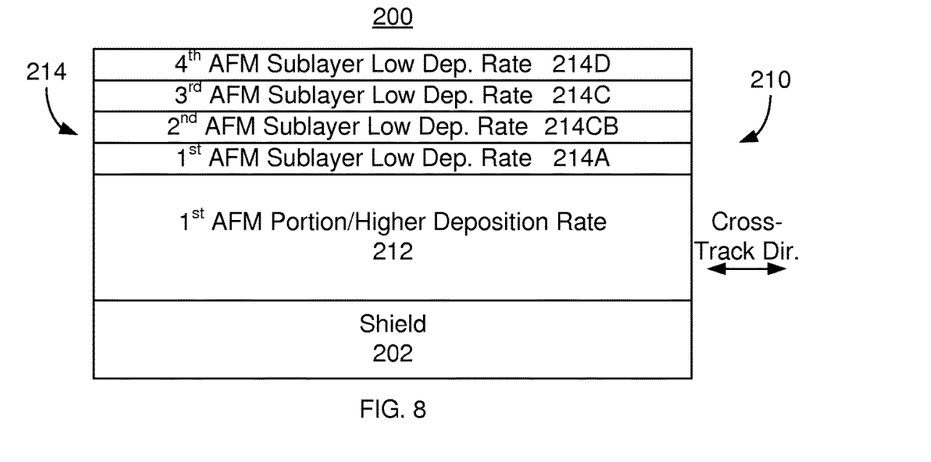

Steps 156 and 158 are repeated until the AFM layer 210 is completed, via step 160. FIG. 7 depicts the magnetic read apparatus 200 after one additional iteration of steps 156 and 158 has been completed. Thus, a second sublayer 214B has been formed. FIG. 8 depicts the read apparatus 200 after step 160 has been completed. Thus, a third AFM sublayer 214C and a fourth AFM sublayer 214D have been formed. In other embodiments, a different number of sublayers may be fabricated. The AFM layer 210 thus includes a first portion 212 and a second portion 214. The second portion 214 includes multiple AFM sublayers 214A, 214B, 214C and 214D. The first portion 212 of the AFM layer 210 is thicker than the second portion 214. In some embodiments, the first thickness is at least fifty percent of the total thickness of the AFM layer. The thicknesses of the portions 212 and 214 of the AFM layer 210, the sublayers 212, 212, 212C and 212D and the AFM layer 210 may be in the ranges described above.

Figure 9:
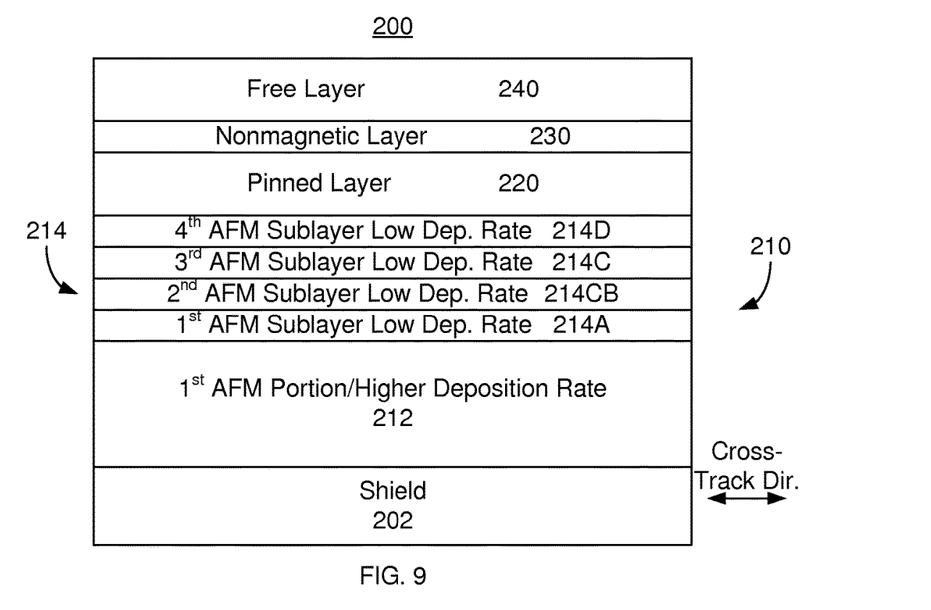

A ferromagnetic pinned layer is provided directly on the AFM layer 210, via step 162. Step 162 is analogous to step 104 of the method 100. A nonmagnetic layer is provided on the ferromagnetic pinned layer, via step 164. Step 164 may be analogous to step 106. A ferromagnetic free layer is deposited on the nonmagnetic layer, via step 166. Step 166 may be analogous to step 108. FIG. 9 depicts the read apparatus 200 after step 166 has been performed. Thus, a pinned layer 220, a nonmagnetic layer 230 and a free layer 240 have been formed. The pinned layer 220 is exchange coupled to the second portion 214 of the AFM layer 210. Although not shown, seed and/or capping layer(s) may be provided.

Figure 10:
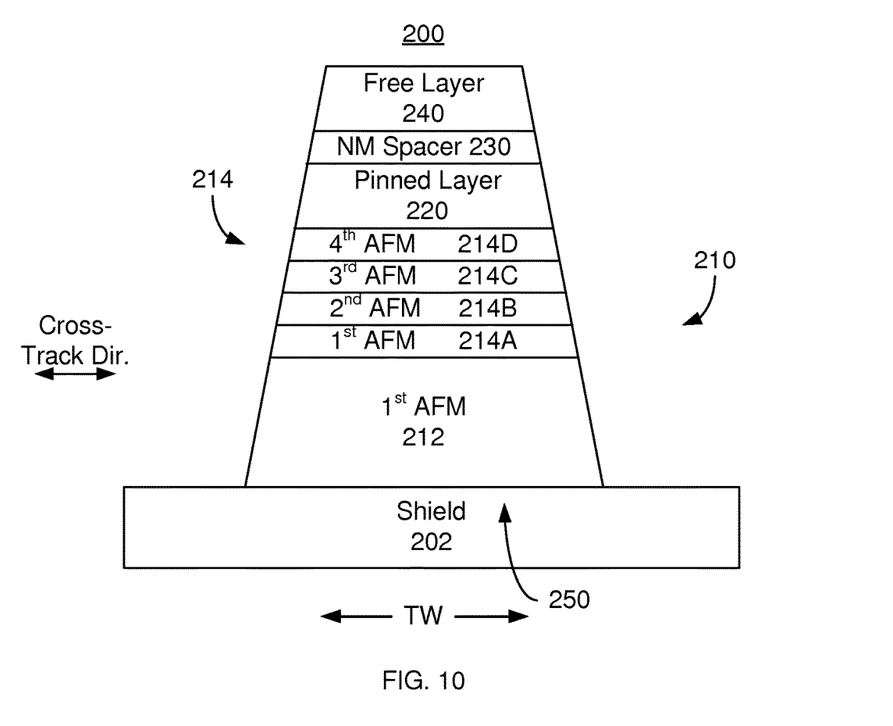
Figure 11:
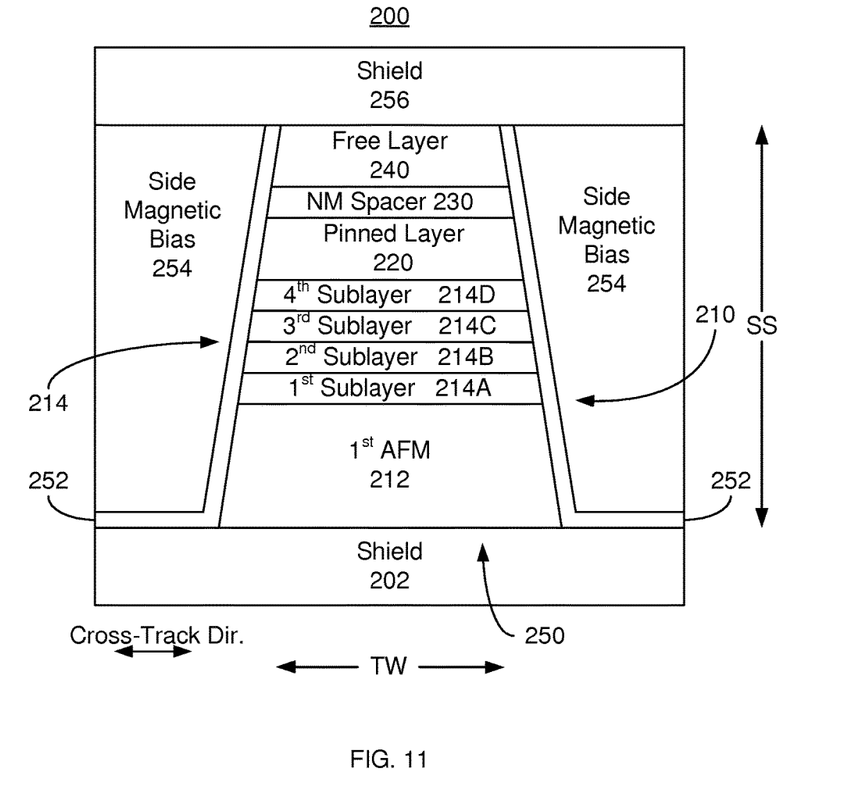

The read sensor is defined in a cross track direction and a stripe height direction, via step 168. Step 168 may be analogous to step 110. In addition, portions of step 168 may be carried out at different times. For example, the read sensor may be defined in a cross track direction, then other structures formed. For example, side magnetic bias structures may be provided. After these and optionally other structures are formed, the read sensor may be defined in the stripe height direction. FIG. 10 depicts the read apparatus 200 after step 168 is performed. Thus, the read sensor 250 having track width TW has been defined. Fabrication may then be completed. This may include providing side magnetic bias structures, providing a top (trailing) shield and lapping the read apparatus to define a media-facing surface, such as an air-bearing surface (ABS). In addition, a write apparatus, electronics and other components may be formed. FIG. 11 depicts the read apparatus 200 after fabrication is completed. Thus, insulating layers 252, side magnetic bias structures 254 and shield 256 have been provided. The read apparatus 200 has shield-to-shield spacing SS.

Using the method 150, a read sensor 250 having improved stability may be formed. The AFM layer 210 may have an improved crystal structure, higher blocking temperature, and higher exchange field. Thus, the AFM layer 210 may be magnetically stable despite having a lower volume. As a result, the magnetic moment of the pinned layer 220 may be better fixed in place at higher areal densities (e.g. lower track widths and/or shield-to-shield spacings). The stability and performance of the read sensor 250 may thus be improved. As a result, the read sensor that are usable in higher areal density memories may be formed. Furthermore, depositing the first portion 212 of the AFM layer at a higher rate than the second portion 214 allows for the time to fabricate the AFM layer 210 to be significantly reduced over an AFM layer that is fabricated only using steps 156, 158 and 160. Thus, manufacturability may be maintained while performance may be enhanced.

What is claimed is:

1. A method for providing a magnetic read apparatus, the method comprising:
   depositing a first portion of an antiferromagnetic (AFM) layer, wherein the first portion is deposited at a first deposition rate, the first portion of the AFM layer having a first thickness;
   depositing a second portion of the AFM layer over the first portion, the second portion comprising a plurality of sublayers, wherein each of the plurality of sublayers is deposited at a sublayer deposition rate that is less than the first deposition rate, the second portion of the AFM layer having a second thickness that is less than the first thickness;
   annealing the first portion of the AFM layer before depositing the second portion of the AFM layer; and
   annealing each of the plurality of sublayers in between depositing two of the plurality of sublayers.

2. The method of claim 1 wherein the first thickness is not more than ninety percent of a total thickness of the AFM layer.

3. The method of claim 1 wherein depositing each of the plurality of sublayers comprises depositing at least one Angstrom and not more than five Angstroms of an AFM material.

4. The method of claim 3, further comprising depositing not more than three Angstroms of the AFM material.

5. The method of claim 1 wherein the first portion is deposited at a first deposition temperature and each of the plurality of sublayers is deposited at a second deposition temperature, and wherein the first deposition temperature and the second deposition temperature are within a temperature range.

6. The method of claim 1 wherein the annealing of each of the plurality of sublayers has an anneal time, the anneal time being not more than two hundred seconds.

7. The method of claim 1 wherein the annealing of each of the plurality of sublayers has an anneal time and the depositing of each of the plurality of sublayers has a deposition time, the anneal time not exceeding twice the deposition time.

8. The method of claim 1 wherein the first portion is annealed at a first annealing temperature and each of the plurality of sublayers is annealed at a second annealing temperature, wherein the first annealing temperature and the second annealing temperature are within a temperature range.

9. The method of claim 1 wherein the second thickness of the second portion of the AFM is not more than thirty Angstroms.

10. The method of claim 9 wherein the second thickness is at least seven Angstroms and not more than twenty Angstroms.

11. The method of claim 1, further comprising:
    depositing a ferromagnetic pinned layer on the AFM layer such that the ferromagnetic pinned layer and the AFM layer share an interface;
    depositing a nonmagnetic layer on the ferromagnetic pinned layer; and
    depositing a ferromagnetic free layer on the nonmagnetic layer.

12. The method of claim 11, further comprising:
    providing at least one side bias magnetic structure adjacent to the AFM layer, the ferromagnetic pinned layer, the nonmagnetic layer, and the ferromagnetic free layer.

13. The method of claim 1 wherein the first deposition rate does not exceed 0.3 Angstrom/second.

14. The method of claim 1 wherein the sublayer deposition rate is at least 0.01 Angstrom/second.

15. A method for providing a magnetic read apparatus, the method comprising:

depositing a first portion of an antiferromagnetic (AFM) layer at a first deposition rate, the first portion of the AFM layer having a first thickness;

annealing the first portion of the AFM layer;

depositing a second portion of the AFM layer over the first portion after annealing of the first portion, the second portion comprising a plurality of sublayers and having a second thickness that is less than the first thickness, wherein each of the plurality of sublayers is deposited at a sublayer deposition rate that is less than the first deposition rate;

annealing each of the plurality of sublayers after depositing each of the plurality of sublayers and before depositing a next sublayer;

depositing a ferromagnetic pinned layer on the AFM layer such that the ferromagnetic pinned layer and the AFM layer share an interface;

depositing a nonmagnetic layer on the ferromagnetic pinned layer; and depositing a ferromagnetic free layer on the nonmagnetic layer.

16. The method of claim 15 further comprising:

providing at least one side bias magnetic structure adjacent to the AFM layer, the ferromagnetic pinned layer, the nonmagnetic layer, and the ferromagnetic free layer.

17. A method comprising:

depositing a first portion of an antiferromagnetic (AFM) layer at a first deposition rate, the first portion having a first thickness;

depositing a second portion of the AFM layer over the first portion at a second deposition rate that is less than the first deposition rate, wherein depositing the second portion comprises depositing a plurality of sublayers including a first sublayer, a second sublayer, a third sublayer, and a fourth sublayer, and wherein the second portion has a second thickness that is less than the first thickness;

annealing the first portion after depositing the first portion and before depositing the second portion; and annealing each of the first sublayer, the second sublayer, the third sublayer, and the fourth sublayer after depositing each sublayer and before depositing a next sublayer.

18. The method of claim 1, wherein depositing the second portion over the first portion comprises depositing the second portion directly over the first portion.

* * * * *